(12) United States Patent
Pearce et al.

(10) Patent No.: US 11,739,556 B2
(45) Date of Patent: Aug. 29, 2023

(54) AWNING

(71) Applicant: PATRIOT CAMPERS HOLDINGS PTY LTD., Molendinar (AU)

(72) Inventors: Simon Noel Pearce, Sunny Bank Hills (AU); Justin Montesalvo, Nerang (AU)

(73) Assignee: PATRIOT CAMPERS HOLDINGS PTY LTD., Molendinar (AU)

( * ) Notice: Subject to any disclaimer, the term of this patent is extended or adjusted under 35 U.S.C. 154(b) by 122 days.

(21) Appl. No.: 16/889,848

(22) Filed: Jun. 2, 2020

(65) Prior Publication Data

US 2020/0384836 A1    Dec. 10, 2020

(30) Foreign Application Priority Data

Jun. 4, 2019   (AU) ................................ 2019901925

(51) Int. Cl.
*E04H 15/08* (2006.01)
*B60J 7/12* (2006.01)
*B60J 7/08* (2006.01)
*E04H 15/06* (2006.01)

(52) U.S. Cl.
CPC ............... *E04H 15/08* (2013.01); *B60J 7/12* (2013.01); *B60J 7/085* (2013.01); *E04H 15/06* (2013.01)

(58) Field of Classification Search
CPC ........... E04H 15/06; E04H 15/08; B60J 7/085
USPC ........................................ 135/88.07; 296/154
See application file for complete search history.

(56) References Cited

U.S. PATENT DOCUMENTS

| | | | | |
|---|---|---|---|---|
| 3,730,196 A | * | 5/1973 | Borskey ................. | B60P 3/343 135/88.11 |
| 4,188,964 A | * | 2/1980 | Greer ..................... | B60P 3/343 160/67 |
| 5,381,814 A | * | 1/1995 | Brandon ................ | B60P 3/343 135/88.07 |
| 2007/0113879 A1 | * | 5/2007 | Li ......................... | E04H 15/08 135/88.07 |
| 2013/0092204 A1 | * | 4/2013 | Finck ..................... | E04H 15/08 135/88.07 |
| 2016/0208514 A1 | * | 7/2016 | Finck ..................... | E04H 15/08 |

(Continued)

FOREIGN PATENT DOCUMENTS

DE    20 2014 008 060 U1    12/2014
DE       202014008060 U1 *  1/2015 ............ B60P 3/0257
(Continued)

*Primary Examiner* — Noah Chandler Hawk
(74) *Attorney, Agent, or Firm* — Tucker Ellis LLP

(57) ABSTRACT

A multiconfiguration, deployable awning assembly to be mounted to a vehicle, the awning assembly including a housing having at least a rear wall portion to mount relative to a vehicle, a top wall portion and a spaced apart bottom wall portion, at least one deployable arm assembly including a primary pivot mounted between the top wall portion and bottom wall portion of the housing, at least two arms, each arm including a pair of spaced apart elongate members, one upper arm member and one lower arm member, both arm members mounted relative to a pivot, one of the arms mounted relative to the primary pivot and at least one flexible awning sheet mounted relative to the arms, the awning movable between a stored configuration and a deployed configuration by rotation of the arms about the primary pivot.

20 Claims, 11 Drawing Sheets

(56) References Cited

U.S. PATENT DOCUMENTS

2016/0251872 A1* 9/2016 Tucker .................... E04H 15/08
                                                    135/88.01
2019/0359110 A1* 11/2019 Bekaert ............... E04F 10/0625
2020/0141151 A1* 5/2020 Everett ................... E04F 10/04

FOREIGN PATENT DOCUMENTS

DE  20 2015 104 513 U1    1/2017
EP         0030398 A2 *   6/1981   ............. E04H 15/08
KR       101976327 B1 *   5/2019

* cited by examiner

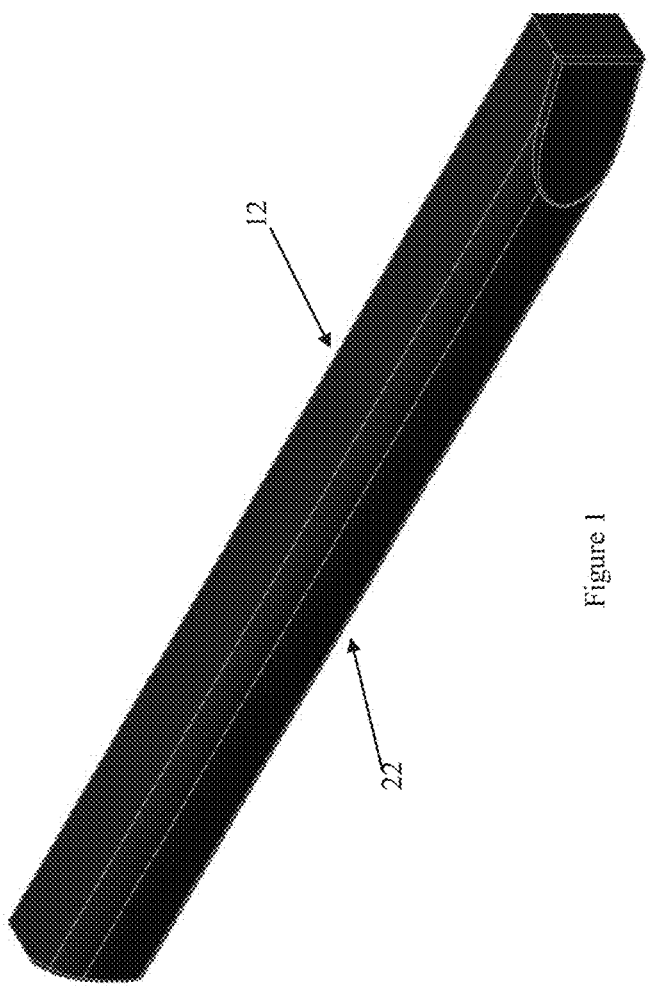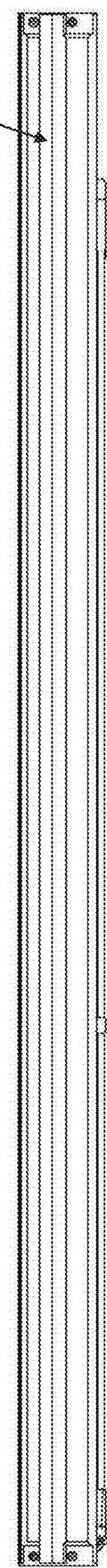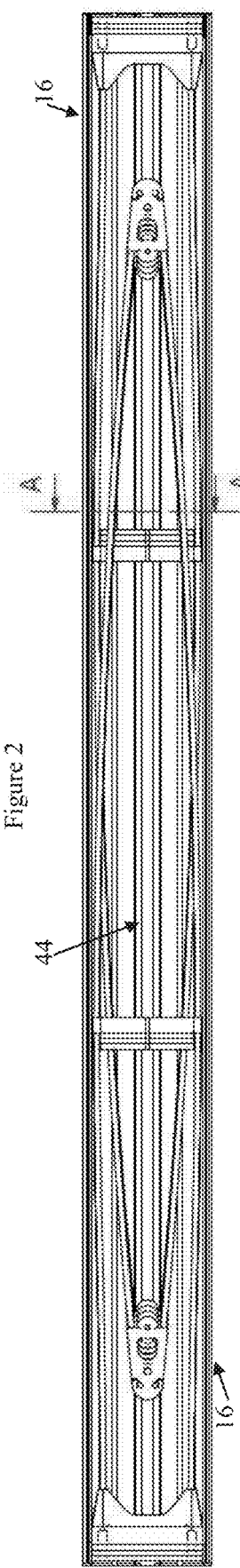
Figure 1
Figure 2
Figure 3

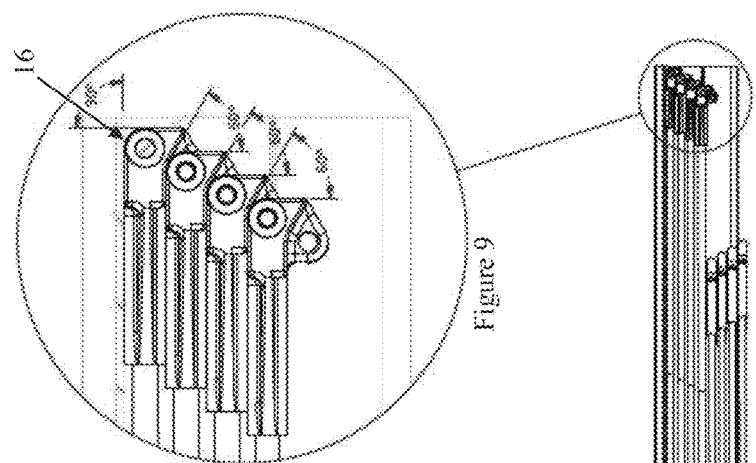
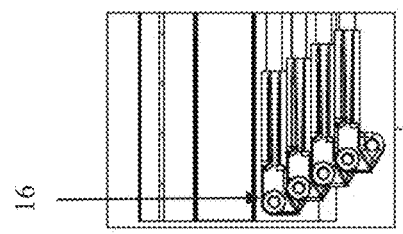
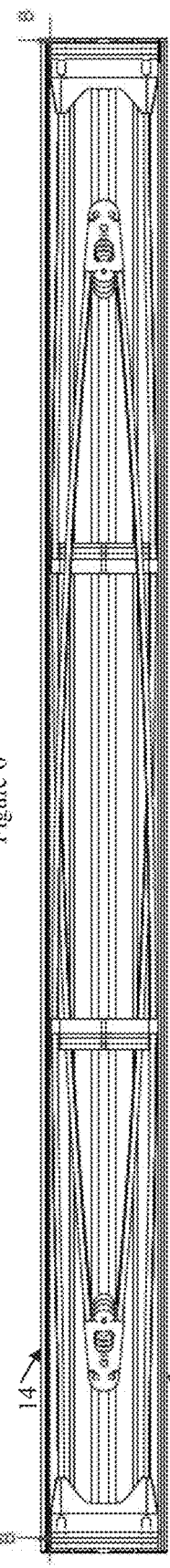
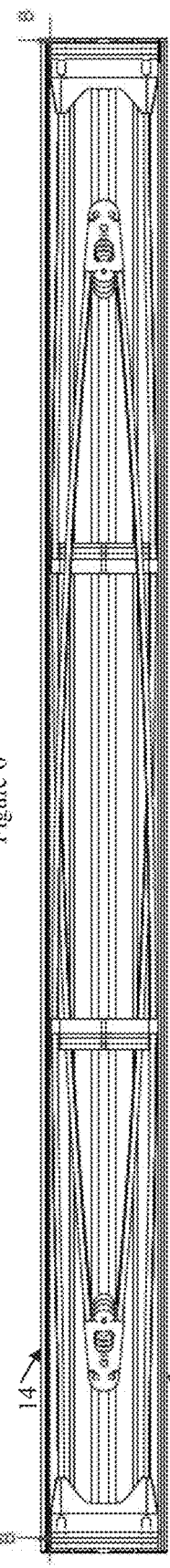

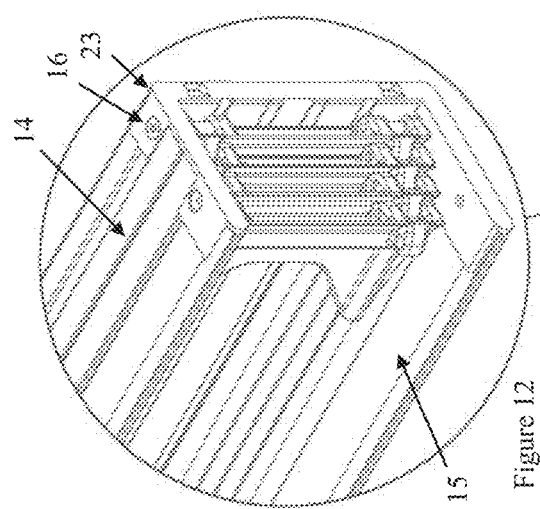
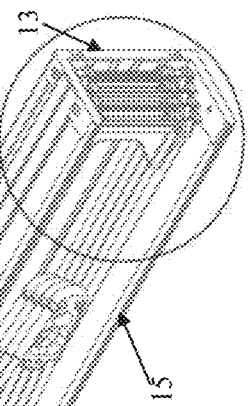
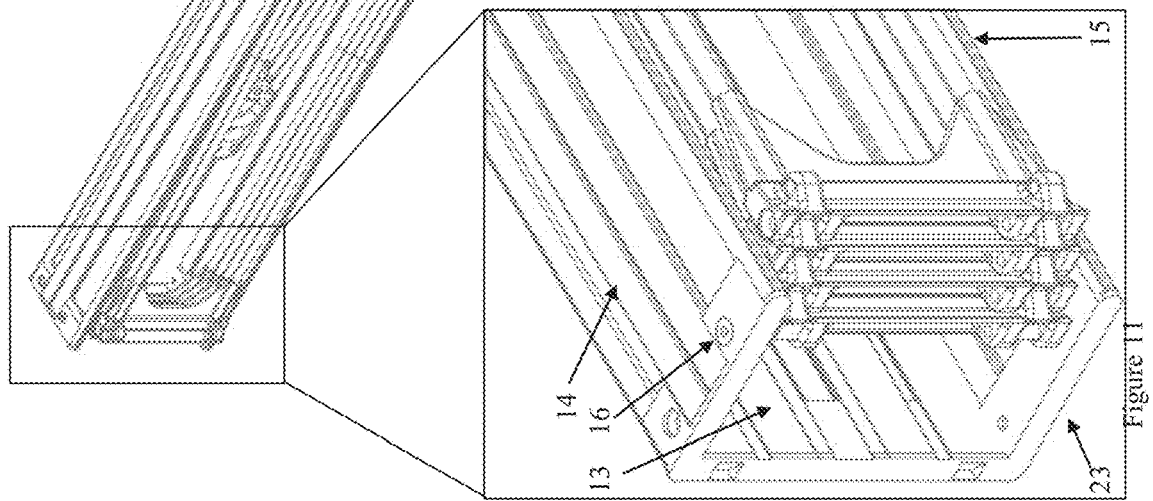

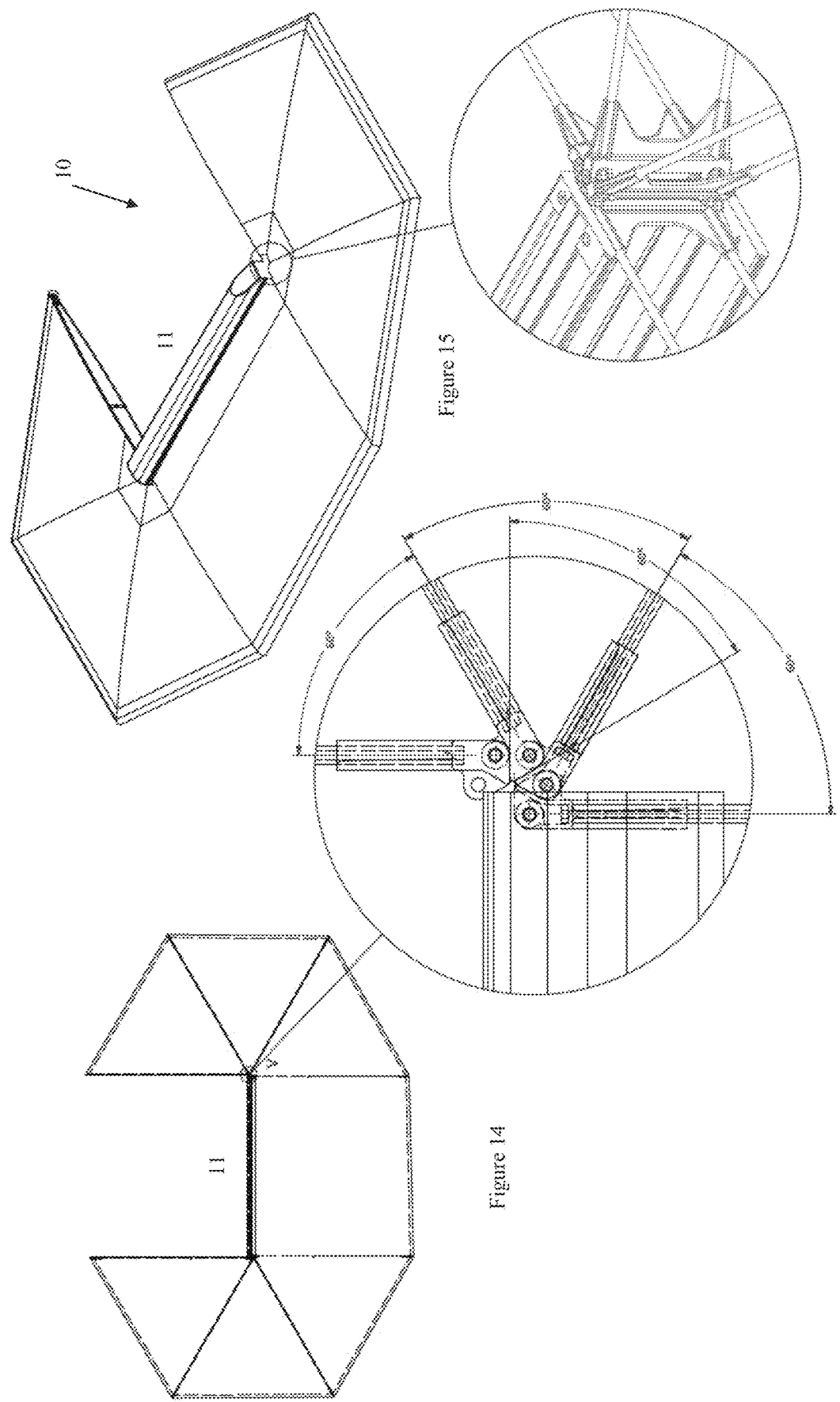

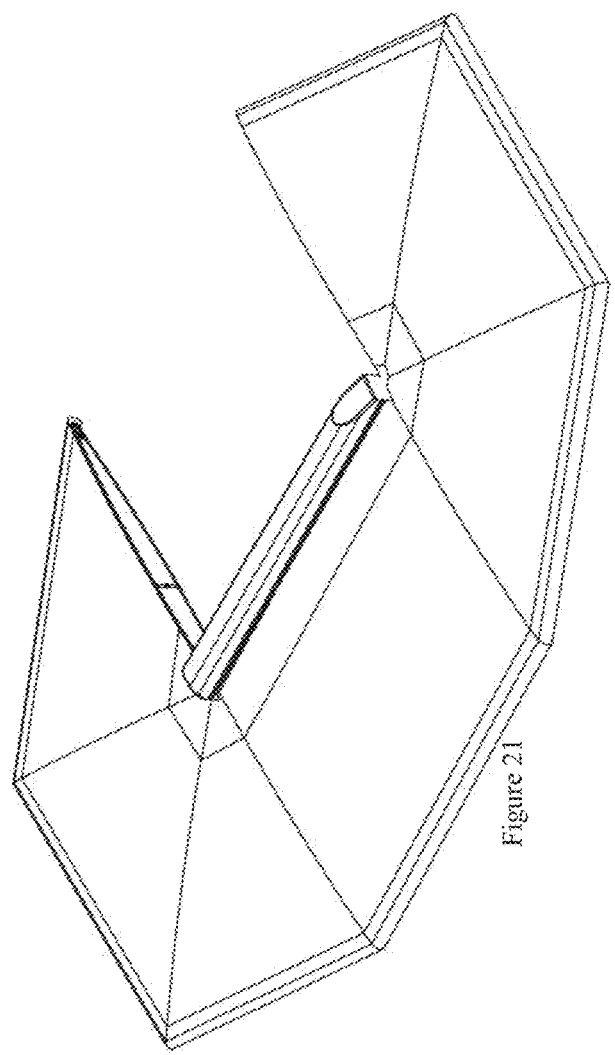
Figure 21
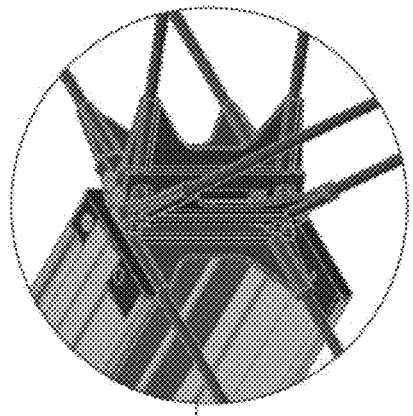
Figure 24
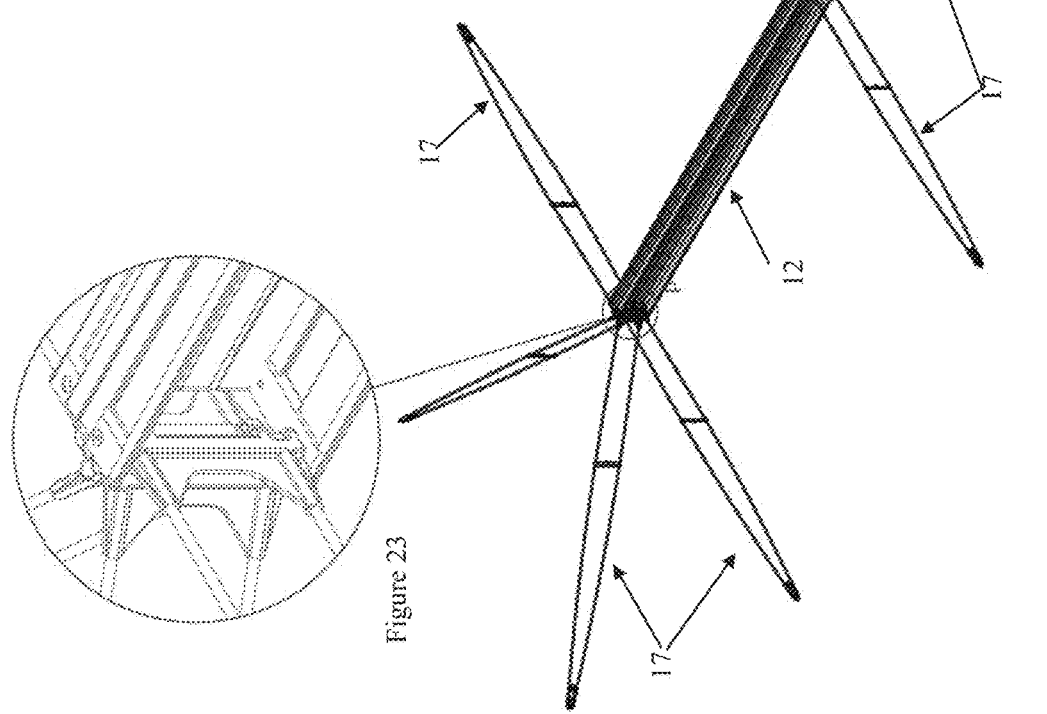
Figure 23
Figure 22

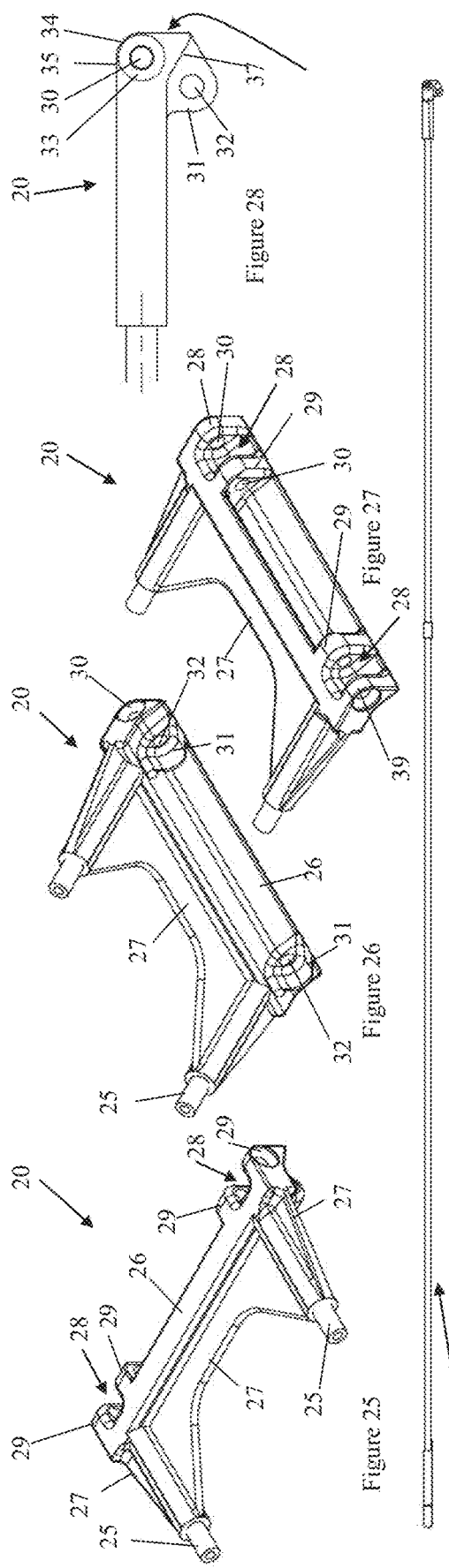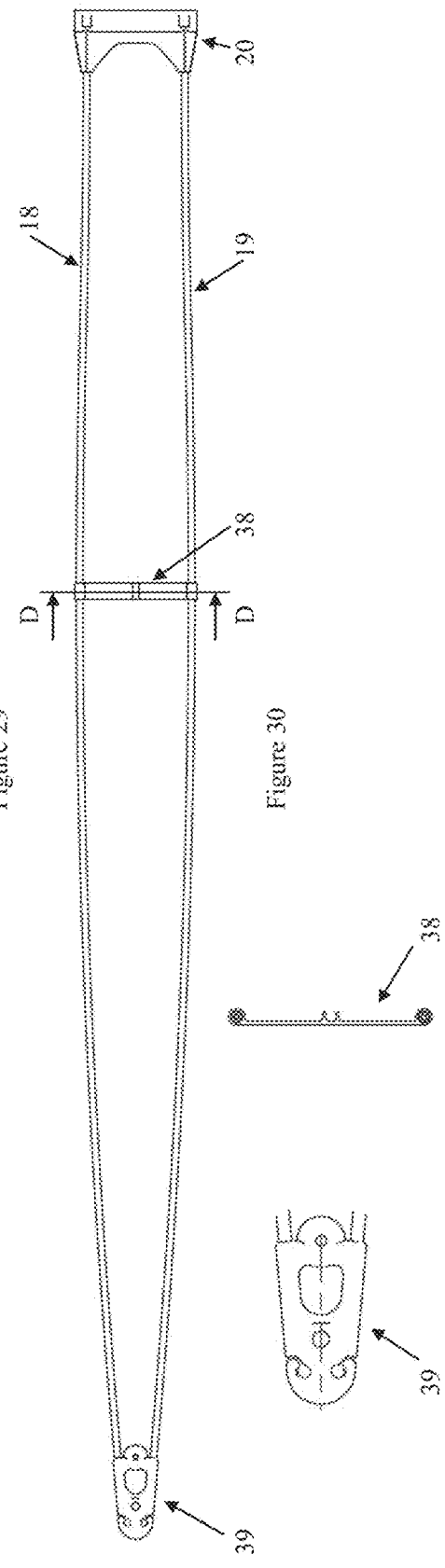

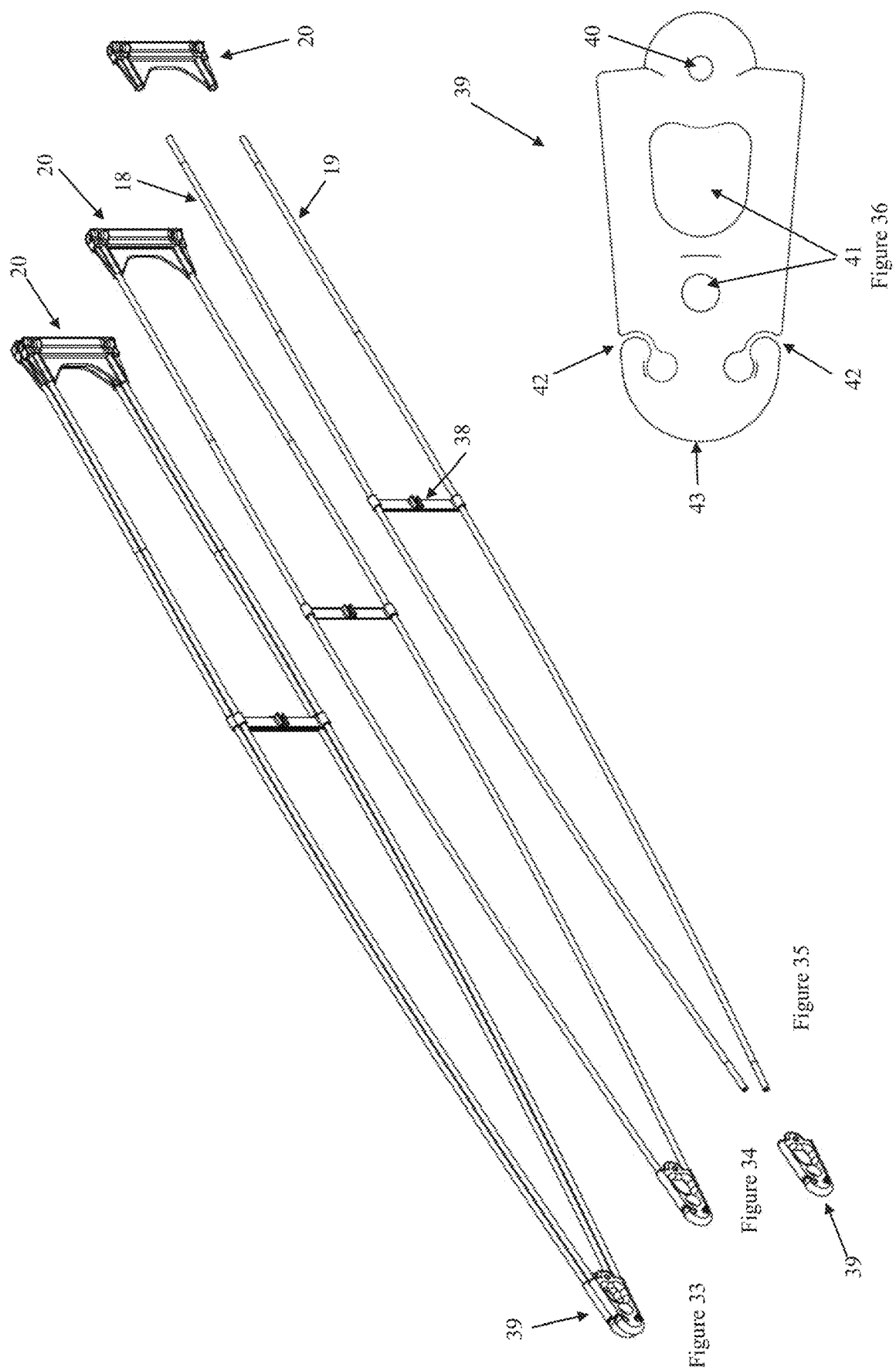

AWNING

RELATED APPLICATION DATA

This application claims priority to AU 2019901925, filed Jun. 4, 2019, which is hereby incorporated herein by reference.

TECHNICAL FIELD

The present invention relates generally to accessories for vehicles and more particularly to a multiconfiguration, deployable awning to be mounted to a vehicle.

BACKGROUND ART

Deployable awnings that are mounted to or relative to a vehicle are available and are used particularly with 4WD vehicles. Normally, a 4WD vehicle is provided with a roof rack assembly and an elongate housing is mounted longitudinally of the vehicle to the roof rack assembly.

The elongate housing is provided with an elongate drum about which a length of awning material is mounted for extension and retraction. Some awnings have a drum which is spring loaded to apply a force to the drum against which the awning is extended and which provides a bias to the retracted position.

The housing is typically provided in the form of a heavy-duty nylon reinforced PVC bag with an elongate zipper or similar to open and close the housing.

Once the awning fabric is extended, usually using a drawbar provided at the free end, the drum can be locked in position, a pair of height adjustable telescopic legs are mounted to the ends of the drawbar and one or more side rails may be provided and the awning attached thereto at least temporarily using Velcro® Ties for example. Pegs and guy ropes may be provided for securing the legs.

Awnings of this type are simply pulled manually from the housing in a single direction and then fixed in place for shelter using the vehicle as a fixing point. This means that the shelter is only provided in one direction relative to the vehicle and the sheltered area is rectangular and dimensions according to the length of awning deployed.

It will be clearly understood that, if a prior art publication is referred to herein, this reference does not constitute an admission that the publication forms part of the common general knowledge in the art in Australia or in any other country.

SUMMARY OF INVENTION

The present invention is directed to a multiconfiguration, deployable awning to be mounted to a vehicle, which may at least partially overcome at least one of the abovementioned disadvantages or provide the consumer with a useful or commercial choice.

With the foregoing in view, the present invention in one form, resides broadly in a multiconfiguration, deployable awning assembly to be mounted to a vehicle, the awning assembly including
a housing having at least a rear wall portion to mount relative to a vehicle, a top wall portion and a spaced apart bottom wall portion,
at least one deployable arm assembly including
 a primary pivot mounted between the top wall portion and bottom wall portion of the housing
 at least two arms, each arm including a pair of spaced apart elongate members, one upper arm member and one lower arm member, both arm members mounted relative to a pivot, one of the arms mounted relative to the primary pivot and
 at least one flexible awning sheet mounted relative to the arms,
 the awning movable between a stored configuration and a deployed configuration by rotation of the arms about the primary pivot.

The awning of the present invention is configured to be selectively deployable to the extend that a user requires, quickly and easily but to also be stored quickly and easily. The awning of the present invention is also lightweight and to a larger degree than prior art awnings, self supporting.

The awning of the present invention will preferably be mounted relative to a vehicle. Normally, the housing will be mounted relative to the vehicle and then the awning can be deployed from the housing using the vehicle as a fixture point. This will typically mean that the weight of the awning can be cantilevered against the weight of the vehicle.

One or more legs may be provided in order to support an end of at least one of the arms to support a least a part of the weight of the awning. If provided, it is preferred that the legs will be releasably attachable to an outer end of one or more of the arms.

The awning of the present invention will be deployed from the housing and will be folded back into the housing for storage and for travel.

The awning of the present invention includes a housing having at least a rear wall to mount relative to a vehicle, a top wall portion in a spaced apart bottom wall portion. Typically, a cover is mounted or mountable relative to the top wall portion and/or bottom wall portion in order to close the housing. The cover will typically be moved out of position in order to allow the at least one deployable arm assembly to be deployed. Preferably, the cover will be attached to the housing and the cover may be removably attached to the housing. Typically, the cover will be pivotally mounted to the housing such that it can be rotated out of the way prior to deployment of the at least one deployable arm assembly. The rear wall, top wall and bottom wall may be a single extruded member.

The housing will preferably include a pair of end walls. The end walls may be formed with the rear wall, top wall or bottom wall or may be separate components which are attached relative to the rear wall, top wall and bottom wall in order to define housing. The end walls may form a part of the cover but preferably, the end walls are components which are formed separately to the rear wall, top wall and bottom wall and are attached in position relative to these 3 walls. In some preferred embodiments, the top wall, rear wall and bottom wall will be attached relative to one another through the provision of an end cap which also provides mounting points for the primary pivot pin of each of the at least one deployable arm assemblies.

The housing will typically be rigid. The housing will typically have an aerodynamic shaped forward end (in the direction of travel of the vehicle).

The housing can be manufactured from any material but it is preferred that the housing be lightweight but strong and therefore, a plastic material could be used but it is preferred that the rear wall, top wall and bottom wall are each a light metal such as aluminium. Preferably, these walls will be and therefore have a fixed cross-section over the length.

Preferably, each of the rear wall, top wall and bottom wall will extend the full length of the housing. Normally, the top wall and bottom wall will be attached to the rear wall, preferably substantially perpendicularly in order to define a substantially U-shaped housing into which the at least one deployable arm assembly is fitted.

Overall, the housing will preferably be generally rectangular.

The rear wall will typically be mounted to or relative to a vehicle. Typically the rear wall will be mounted to or relative to the vehicle in an elevated position and preferably to a roof rack assembly or mounting rails provided on the roof of the vehicle. Normally, the housing will be attached relative to one side of the vehicle.

The awning of the present invention includes at least one deployable arm assembly. Preferably a pair of arm assemblies are provided. Preferably, each of the pair of arm assemblies are provided mounted relative to opposite ends of the housing. In a particularly preferred embodiment, the arm assemblies will preferably be mounted in an offset configuration within the housing. One deployable arm assembly is preferably mounted about a primary pivot which is mounted relative to the top and bottom wall of the housing immediately adjacent to the rear wall of the housing at one end of the housing and a second deployable arm assembly is preferably mounted about a primary pivot which is mounted relative to the top and bottom wall of the housing in front of the first arm assembly, that is closer toward the free ends of the top wall and bottom wall and further away from the rear wall. Provision of the deployable arm assemblies in this configuration allows space to store the arms of the rearmost arm assembly behind the primary pivot of the forward arm assembly. In this configuration, each of the deployable arm assemblies will typically pivot or rotate into the deployed condition in opposite directions to one another.

Preferably, one or more awning sheets will be attached to at least one deployable arm assembly and preferably both deployable arm assemblies. Typically, an awning sheet is attached between the rear arm of the rear arm assembly and the rear arm of the front arm assembly. Together with attachment or mounting relative to the other arms in the at least one deployable arm assembly, this will allow a user to deploy the forward arm assembly in a 1st direction and then the rearward arm assembly in the opposite direction with the awning sheet connecting both of the arm assemblies together to form a continuous awning.

The primary pivot of the at least one deployable arm assembly preferably mounts the arm assembly relative to the housing. The other arms in a deployable arm assembly are then preferably mounted relative to the primary pivot with each arm in a deployable arm assembly mounted relative to each adjacent arm.

The primary pivot will typically be a pivot pin, preferably an elongate pin mounted to both the top and bottom wall of the housing. The primary pivot will preferably mount a pivot knuckle relative to which an arm having a pair of spaced apart elongate arm members is provided and relative to which a 2nd pivot knuckle is mounted with a 3rd pivot knuckle mounted to the 2nd pivot knuckle and a 4th pivot knuckle mounted to the 3rd pivot knuckle. This will form a 4-arm deployable arm assembly and although smaller or larger arm assemblies may be provided, the inventor has found that a four-arm configuration is optimal. The pivot knuckles will typically nest when closed and will preferably be offset longitudinally from one another when mounted relative to the housing.

Each pivot knuckle will typically have an arm associated therewith, each arm including a pair of spaced apart elongate arm members which are mounted on, relative to or extending from the pivot knuckle.

Each pivot knuckle will typically be substantially C-shaped in elevation. The pivot knuckle will preferably be manufactured from a light, but strong material, and preferably in one piece from either plastic or a light metal.

Each pivot knuckle will typically have an upper arm connector/mount and a lower arm connector/mount which are spaced apart and substantially parallel to one another. An elongate body will preferably mount the upper arm and the lower arm and be oriented substantially vertically in use.

Each of the upper arm connector/mount and the lower arm connector/mount will preferably be generally cylindrical. Each arm member will typically be elongate and substantially circular in cross-section with an end portion which is hollow and tubular in order to be received over the generally cylindrical upper arm connector/mount and lower arm connector/mount.

Each of the upper arm connector/mount and lower arm connector/mount will typically have stiffening or bracing provided between the connector/mount and the elongate body in order to maintain the connector/mount in orientation relative to the elongate body. Typically, each of the connector/mounts will be substantially perpendicular to the elongate body and each will mount an arm member.

The body of the pivot knuckle preferably has at least one and preferably a pair of mounting grooves provided on a rear side in use. Preferably, the mounting grooves will each be defined between a pair of blocks. An opening is preferably provided through each of the blocks transversely to the mounting grooves in order to receive a pivot pin. The grooves therefore in the preferred embodiment will typically be substantially perpendicular to the pivot pin. Insertion of the pivot pin through the openings in the respective blocks can then be used to attach an adjacent pivot knuckle relative to a 1st pivot knuckle by location of a tongue having a mounting opening (explained further below) on the adjacent pivot knuckle in the respective grooves and then inserting the pivot pin through the aligned openings.

A countersunk portion is preferably provided about an upper opening in an upper block and a lower opening in a lower block in order to seat the head of the pivot pin to be substantially coplanar with the surface of the upper and lower block respectively.

Each of the blocks will typically have an arcuate rear corner between the substantially planar rear wall and a substantially perpendicular and planar sidewall. The rear wall and/or sidewall will typically function to limit rotation of the pivot knuckle and/or an adjacent pivot knuckle.

A rotation stop face is preferably provided to prevent over rotation of one pivot knuckle relative to another pivot knuckle. The rotation stop face is preferably angled so as to limit rotation of a pivot knuckle relative to another pivot knuckle to approximately 60° although this will depend upon the configuration and number of arms provided.

The body of the pivot knuckle preferably also has a pair of tongues provided on an opposite side of the body to the blocks defining the grooves. In use, each of the tongues of one pivot knuckle will typically be received within a respective groove in an adjacent pivot knuckle in order to attach the pivot knuckles together but still allow rotation of the pivot knuckles relative to one another. As mentioned above, there is typically a mounting opening provided in each tongue, preferably transversely through each tongue and this will align with the mounting opening provided in each of the blocks.

The tongue is preferably arcuate. As mentioned above, the tongue is typically received in the groove of an adjacent pivot knuckle in a pivot pin inserted through the aligned openings in order to attach the pivot knuckles to one another.

The shaped groove and tongue will also preferably have shaped abutment surfaces which, when they abut, limit rotation of a pivot knuckle relative to a 2nd pivot knuckle.

A pair of spaced apart elongate arm members are mounted to and preferably attached directly to each pivot knuckle. Each of the arm members is typically circular in cross-section and configured as a rod. Whilst any material of construction can be used, a light weight but strong material such as carbon fibre or fibreglass or similar is preferred. Typically, an arm member is provided for each connector/mount. Once attached, the arm members will typically be spaced apart. A spreader component is preferably provided between the arm members of an arm in order to maintain the arm members separately to one another. The spreader component will typically be offset in position on adjacent arms to allow stacking of the arms in the stowed condition.

A toe connector is preferably provided at an outermost end of each arm in order to connect the outer ends of the respective arm members of an arm relative to one another.

Normally, an opening is provided in the toe connector in order to insert an outer end of each of the respective arm members. One upper opening is provided and one lower opening is provided in a preferred form.

An opening is preferably provided on the toe connector in order to allow for attachment of a support leg if provided. One or more openings may be provided to attach ropes or similar cables to the toe connector in order to tie down or fix the awning in position when deployed.

One or more slots will preferably be provided adjacent to an outer end of the toe connector in order to receive and retain an edge of an awning sheet relative thereto.

The toe connector will preferably have an arcuate outer end. The toe connector will normally be manufactured from a moulded plastic or similar and the shape and configuration of the toe connector will typically mean that an awning sheet can be provided over the top of the upper arm member in an arm and about an outer end of the toe connector before an edge of the awning sheet is seated in the preferred hook slot to retain the awning sheet in position. This will generally minimise any chance of tearing of the awning sheet during assembly.

The configuration explained above will preferably form an elongate substantially triangular shaped arm formed from a pivot knuckle, a pair of arm members, a preferred spreader and a toe connector.

The housing may be provided with one or more lights and in a preferred embodiment, a light strip provided on an interface of the rear wall. In a preferred configuration, the light strip will typically clip to the rear wall and will function to provide light when the awning is deployed.

The awning of the present invention includes at least one awning sheet provided extending between the arms of the at least one deployable arm assembly. One or more awning sheet may be provided. Preferably the awning sheet is mounted relative to the arms and may or may not be mounted relative to the housing itself. The awning sheet may be mounted relative to the arm is releasably in order to allow easy removal of the awning sheet from the arms before storage. However, it is preferred that the awning sheet be mounted relative to the arms during assembly and remain mounted relative to the arms during any subsequent deployment or storage.

Typically, the awning sheet is attached over the upper arm member of each arm and attached to the toe connector via the engagement of an edge of the awning sheet with the hook slot provided in the preferred toe connector. A member may be provided at an outer edge of the awning sheet in order to assist with the attachment to the toe connector.

The awning of the preferred embodiment can therefore be moved between a stored condition and a deployed condition to provide shelter as required and to the degree required by the user. The awning of the preferred embodiment will preferably have a batwing configuration and allow deployment in various configurations as desired by a user.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1 is an isometric view of a housing for an awning according to a preferred embodiment of the present invention.

FIG. 2 is a plan view of the housing illustrated in FIG. 1 with the arcuate cover removed for clarity.

FIG. 3 is a front elevation view of the configuration illustrated in FIG. 2.

FIG. 6 is a front elevation view of the configuration illustrated in FIG. 2.

FIG. 7 is a section view of the configuration illustrated in FIG. 6 along line B-B.

FIG. 8 is a detailed view of the left end pivot knuckle set as illustrated in FIG. 7.

FIG. 9 is a detailed view of the right end pivot knuckle set as illustrated in FIG. 7.

FIG. 10 is an isometric view of the awning of a preferred embodiment positioned in a housing of a preferred embodiment with a hardcover omitted for clarity.

FIG. 11 is a detailed isometric view of the left-hand end of the configuration illustrated in FIG. 10.

FIG. 12 is a detailed isometric view of a right-hand end of the configuration illustrated in FIG. 10.

FIG. 14 is a plan view of an awning of a preferred embodiment in the deployed condition.

FIG. 14A is a detailed view of the portion illustrated in FIG. 14 in identified using reference letter V.

FIG. 15 is an isometric view of the awning illustrated in FIG. 14.

FIG. 15A is a detailed view of the portion illustrated in FIG. 15 with the awning material removed for clarity.

FIG. 21 is an isometric view of an awning according to a preferred embodiment in the deployed condition.

FIG. 22 is an isometric view of the awning illustrated in FIG. 21 with the top surface fabric removed for clarity.

FIG. 23 is a detailed isometric view of the portion identified in FIG. 22 using reference letter P.

FIG. 24 is a detailed isometric view of the portion illustrated in FIG. 21 using reference letter Q.

FIG. 25 is an isometric view from a forward upper side of a pivot knuckle according to a preferred embodiment of the present invention.

FIG. 26 is an isometric view from a forward underside of the pivot knuckle illustrated in FIG. 25.

FIG. 27 is an isometric view from the rear of the pivot knuckle illustrated in FIG. 25.

FIG. 28 is a detailed side elevation view of the pivot knuckle illustrated in FIG. 25.

FIG. 29 is a plan view of a single arm used in an awning according to a preferred embodiment of the present invention.

FIG. 30 is a side view of the arm illustrated in FIG. 29.

FIG. 31 is a detailed view of the left end portion of the arm illustrated in FIG. 30.

FIG. 32 is a sectional view of the spreader illustrated in FIG. 30 along line D-D.

FIG. 33 is an isometric view of two arms according to a preferred embodiment stacked together.

FIG. 34 is an isometric view of the arm illustrated in FIG. 29.

FIG. 35 is an isometric exploded view of the arm illustrated in FIG. 33.

FIG. 36 is a side view of the toe unit of the arm illustrated in FIG. 35.

DESCRIPTION OF EMBODIMENTS

Figure 5:
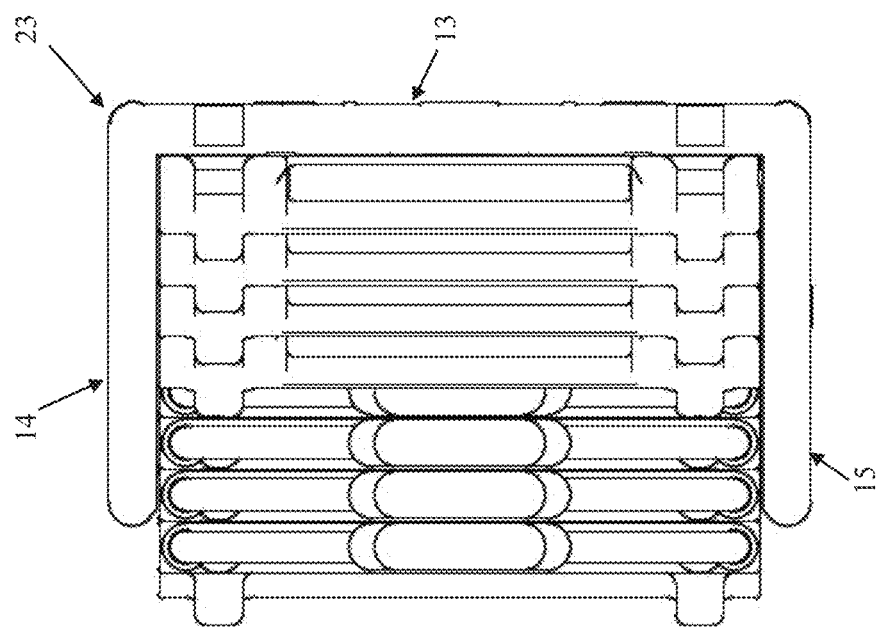
FIG. 5 is an end elevation view of the configuration illustrated in FIG. 3.

According to a particularly preferred embodiment of the present invention, an awning is provided.

The multiconfiguration, deployable awning 10 of the preferred embodiment illustrated in the accompanying Figures is configured to be mounted to a vehicle (which is not shown although the position of the vehicle is indicated generally with reference numeral 11 in FIGS. 37 to 40).

The illustrated awning assembly includes a housing 12 having a rear wall 13 to mount relative to a vehicle (not shown), a top wall 14 and a spaced apart bottom wall 15. A pair of deployable arm assemblies are mounted within the housing 12. These assemblies are best illustrated in FIG. 7 and FIGS. 10 to 12.

In the illustrated embodiment, each deployable arm assembly includes a primary pivot pin 16 mounted between the top wall 14 and bottom wall 15 of the housing 12, four arms 17 (best illustrated in 29 to 35). The arm movement/span angle between arms 17 is limited mechanically by physical interference of the arm knuckle shape, not just fabric tension.

Each arm includes a pair of spaced apart elongate upper arm rod 18 and lower arm rod 19, both arm members 18, 19 mounted relative to a pivot knuckle 20.

One of the arms 17, typically the rearmost arm in each arm assembly is mounted relative to the primary pivot 16 and the other arms are mounted pivotally relative to that arm.

A flexible awning sheet 21 is mounted relative to the arms 17 of the deployable arm assemblies and the deployable arm assemblies and the awning sheet are movable between a stored configuration and a deployed configuration by rotation of the arms 17 about the primary pivot 16 and the other arms 17 about their respective mounting points.

Normally, the housing 12 is mounted relative to the vehicle and then the awning itself can be deployed from the housing 12 using the vehicle as a fixture point. This will typically mean that the weight of the awning can be cantilevered against the weight of the vehicle.

Figure 4:
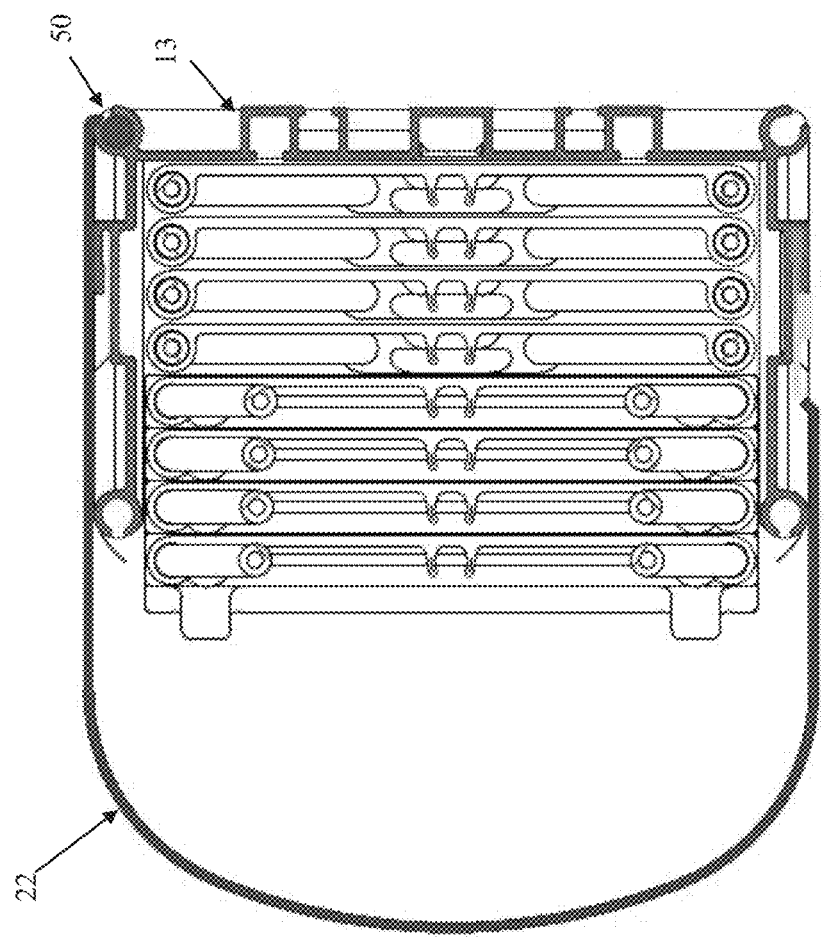
FIG. 4 is a sectional end view of the configuration illustrated in FIG. 3 along line A-A.

In the embodiment illustrated in FIGS. 1 and 4, a cover 22 is mounted relative to the top wall 14 and/or bottom wall 15 in order to close the housing 12. The cover 22 is moved out of position in order to allow the deployable arm assemblies to be deployed. Preferably, the cover 22 is attached to the housing 12, pivotally mounted to the housing 12 relative to the upper rear corner at pivot point 50 as shown in FIG. 4, such that the cover 22 can be rotated out of the way prior to deployment of the deployable arm assemblies.

The housing 12 includes a pair of end walls or end caps which have been removed from most of the Figures for clarity. The end walls may be formed with the rear wall, top wall or bottom wall or may be separate components which are attached relative to the rear wall, top wall and bottom wall in order to define housing. In some preferred embodiments, the top wall 14, rear wall 13 and bottom wall 15 are attached relative to one another through the provision of an end cap 23 (shown in FIG. 5) which also provides mounting points for the primary pivot pin 16 of the deployable arm assemblies.

The housing 12 is rigid and has an aerodynamically-shaped forward end (in the direction of travel of the vehicle) as shown in FIG. 1.

The housing can be manufactured from any material but it is preferred that the housing be lightweight but strong and therefore, a plastic material could be used but it is preferred that the rear wall, top wall and bottom wall are each a light metal such as aluminium. Preferably, these walls will be and therefore have a fixed cross-section over the length.

Preferably, each of the rear wall 13, top wall 14 and bottom wall 15 extend the full length of the housing 12. Normally, the top wall 14 and bottom wall 15 will extend substantially perpendicularly to the rear wall 13 in order to define a substantially U-shaped housing 12 into which the deployable arm assemblies are fitted. Overall, the housing 12 will preferably be generally rectangular.

The rear wall 13 will typically be mounted to or relative to a vehicle. Typically, the rear wall 13 is mounted to or relative to the vehicle in an elevated position and preferably to a roof rack assembly or mounting rails provided on the roof of the vehicle. Normally, the housing 12 will be attached relative to one side of the vehicle.

As shown, it is preferred that a pair of arm assemblies are provided (best shown in FIGS. 7 and 10 to 12). Preferably, each of the arm assemblies is provided mounted relative to opposed ends of the housing 12. In the particularly preferred embodiment shown in FIG. 7, the arm assemblies are mounted in an offset configuration within the housing 12 with a rear deployable arm assembly mounted about a primary pivot pin 16 mounted relative to the top wall 14 and bottom wall 15 of the housing 12 immediately adjacent to the rear wall 13 of the housing at one end of the housing 12 (the right hand end in FIG. 7) and a forward deployable arm assembly mounted about a primary pivot pin 16 which is mounted relative to the top wall 14 and bottom wall 15 of the housing 12 in front of the rear arm assembly, that is closer toward the free ends of the top wall 14 and bottom wall 15 and further away from the rear wall 13 (the left hand end in FIG. 7). Provision of the deployable arm assemblies in this configuration allows space to store the arms 17 of the rear arm assembly behind the primary pivot pin 16 of the forward arm assembly. In this configuration, each of the deployable arm assemblies will typically pivot or rotate into the deployed condition in opposite directions to one another.

As shown in FIGS. 15, 17, 21 and 37 to 40, one or more awning sheets 21 will be attached to the deployable arm assemblies, preferably both arm assemblies. In the illustrated preferred form, an awning sheet 51 is attached between the rear arm of the rear arm assembly and the rear arm of the front arm assembly. Together with attachment or mounting relative to the other arms 17 in the deployable arm assemblies, this will allow a user to deploy the forward arm assembly in a first direction and then the rearward arm assembly in the opposite direction with the awning sheet connecting both of the arm assemblies together to form a continuous awning in any one of the configurations shown in FIGS. 37 to 40 (some of which can be mirrored in the opposite direction).

As shown best in FIGS. 11 and 12, the primary pivot pin 16 of each deployable arm assembly mounts the arm assembly relative to the housing 12. As shown best in FIG. 13, the other arms in a deployable arm assembly are then mounted relative to the primary pivot pin 16 with each arm 17 in a deployable arm assembly mounted relative to each adjacent arm 17 using the pivot knuckle 20 illustrated in FIGS. 25 to 28.

Figure 13:
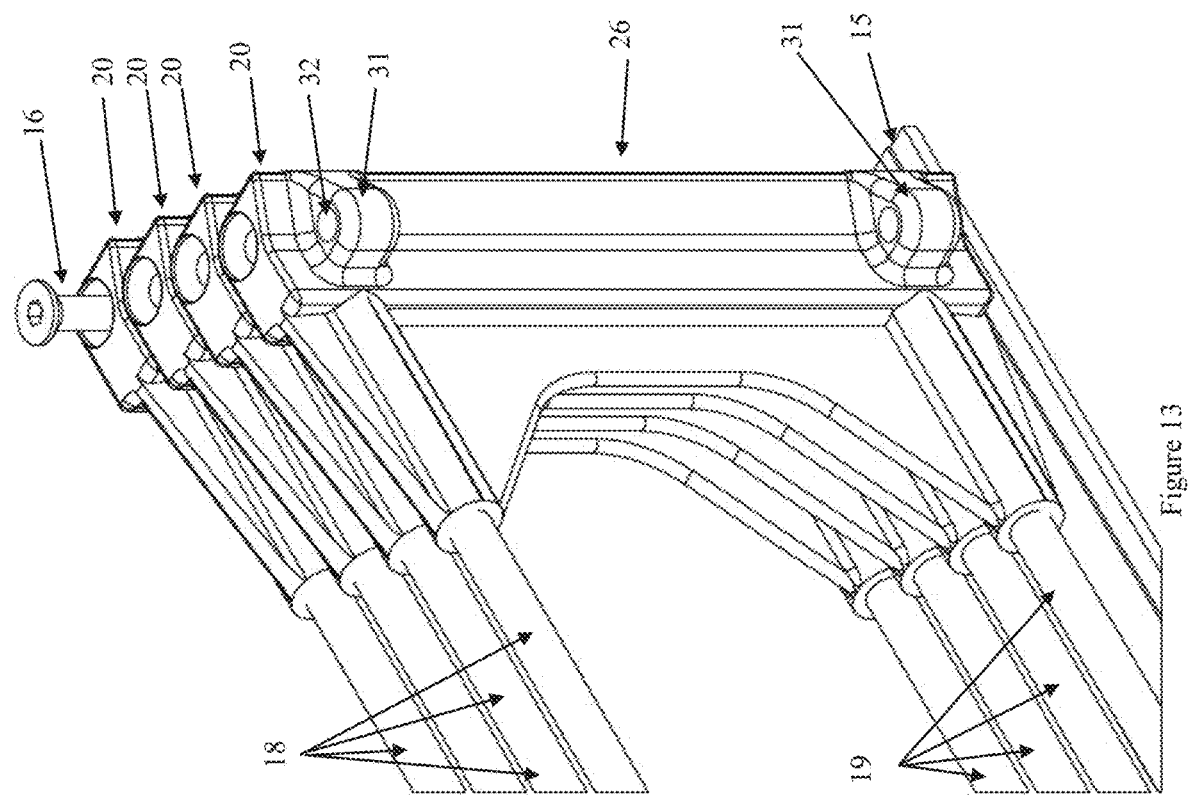
FIG. 13 is an isometric view of the right end pivot knuckle set according to a preferred embodiment of the present invention.
Figure 17:
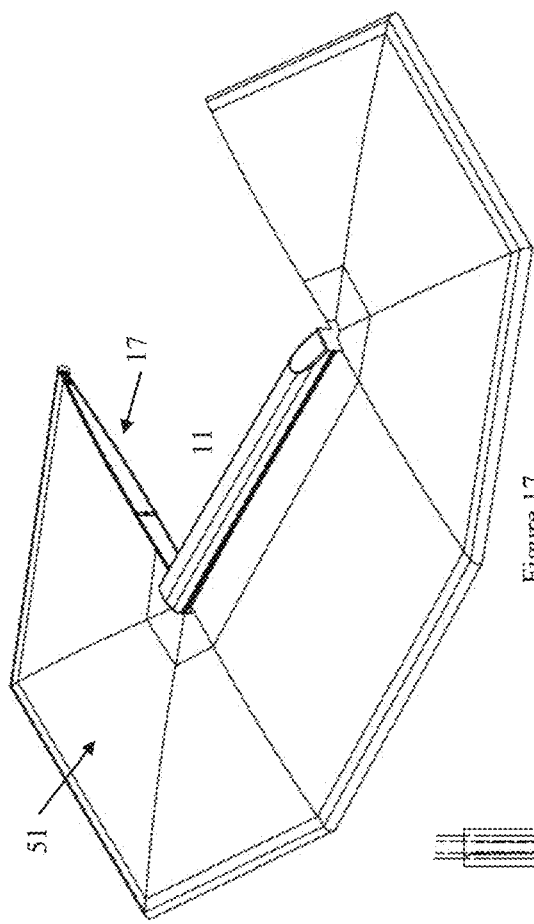
FIG. 17 is an isometric view of the awning illustrated in FIG. 16.
Figure 20:
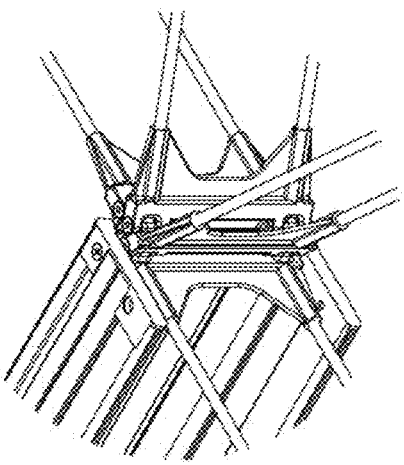
FIG. 20 is a detailed view of portion illustrated in FIG. 17 and identified using reference letter T.
Figure 19:
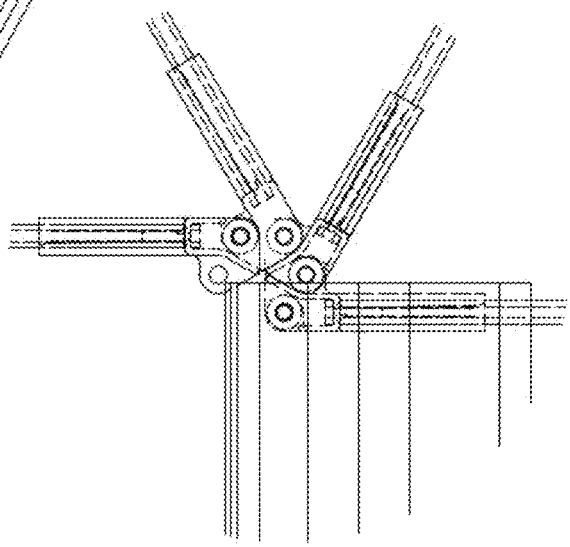
FIG. 19 is a detailed view of portion illustrated in FIG. 16 and identified using reference letter S.
Figure 16:
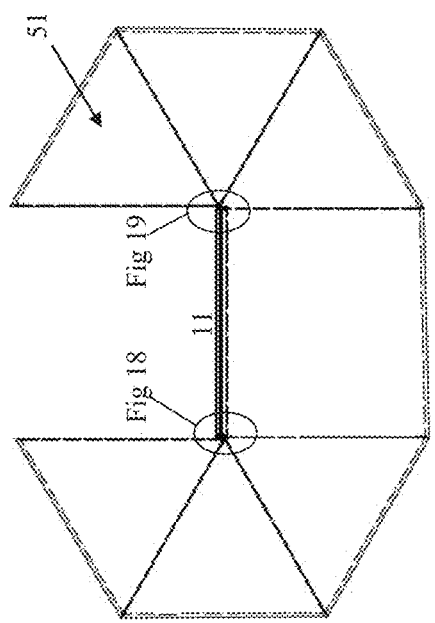
FIG. 16 is a plan view of an awning of a preferred embodiment in the deployed condition.
Figure 18:
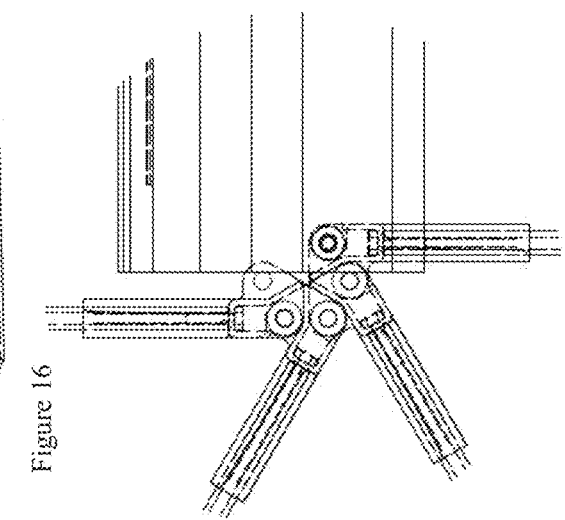
FIG. 18 is a detailed view of portion illustrated in FIG. 16 and identified using reference letter R.
Figure 38:
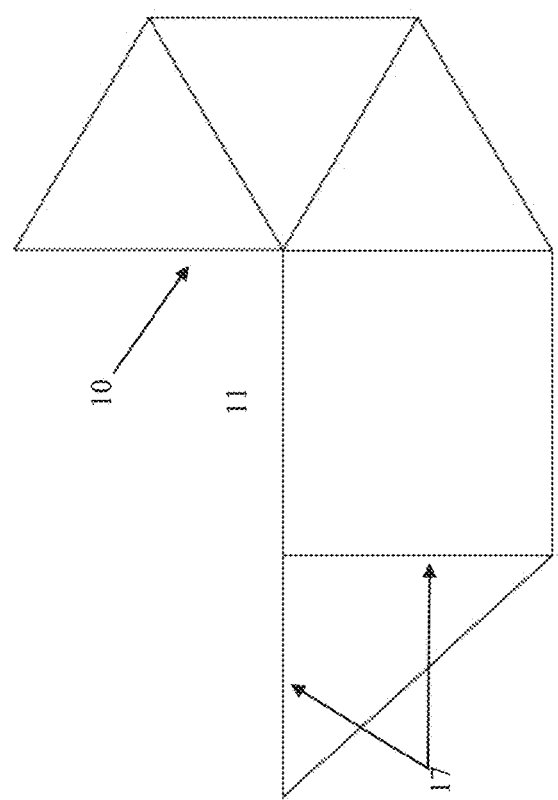
FIG. 38 is a plan view of an awning of a preferred embodiment in an alternative deployed configuration.
Figure 40:
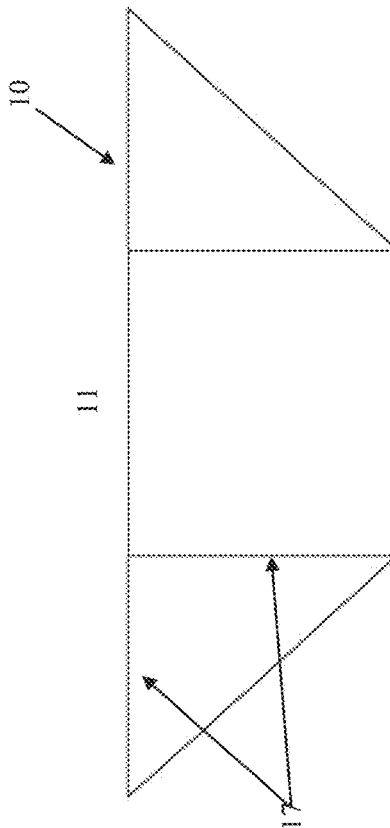
FIG. 40 is a plan view of an awning of a preferred embodiment in an alternative deployed configuration.
Figure 37:
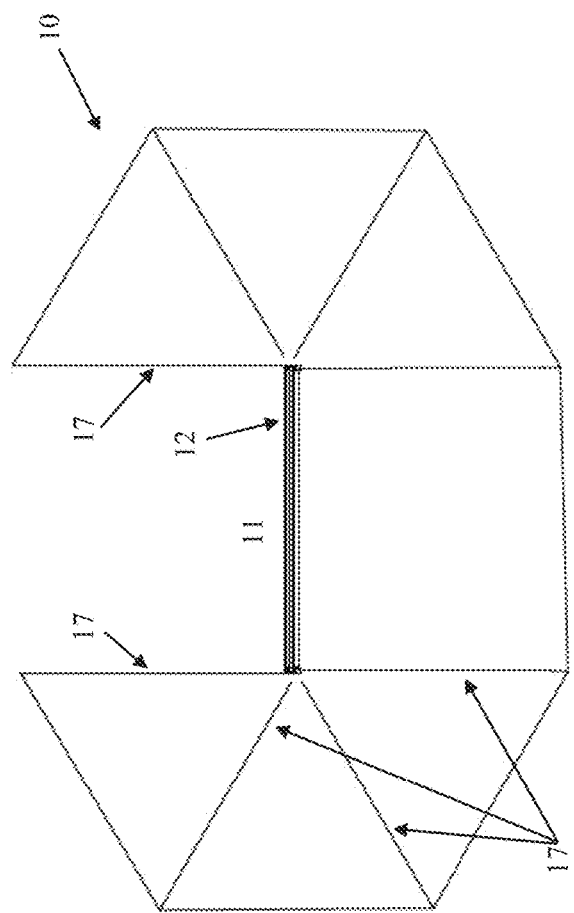
FIG. 37 is a plan view of an awning of a preferred embodiment in a first deployed configuration.
Figure 39:
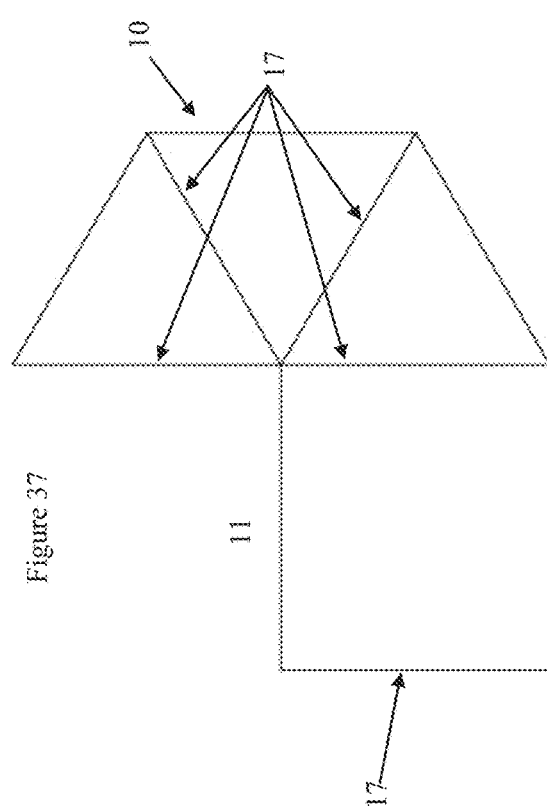
FIG. 39 is a plan view of an awning of a preferred embodiment in an alternative deployed configuration.

The primary pivot pin 16 is preferably an elongate pin mounted to both the top wall 14 and bottom wall 15 of the housing 12. The primary pivot pin 16 mounts a pivot knuckle 20 relative to which an arm 17 having a pair of spaced apart elongate arm rods 18, 19 are provided and relative to which a second pivot knuckle 20 is mounted with a third pivot knuckle 20 mounted to the second pivot knuckle 20 and a fourth pivot knuckle 20 mounted to the third pivot knuckle 20. This will form a four-arm deployable arm assembly (as shown in FIGS. 11 to 13). The pivot knuckles 20 will nest when closed and are offset longitudinally from one another when mounted relative to the housing 12 as shown in FIGS. 11 to 13.

Each arm is formed using the pivot knuckle 20 as a base with each arm 17 including a pair of spaced apart elongate arm rods 18, 19 which are mounted relative to the pivot knuckle 20 as shown in FIG. 30.

As shown in FIGS. 25 to 28, each pivot knuckle 20 is typically substantially C-shaped in elevation, manufactured from a light, but strong material, and preferably in one piece from either plastic or a light metal.

Each pivot knuckle 20 has an upper arm connector/mount 24 and a lower arm connector/mount 25 which are spaced apart and substantially parallel to one another and extend from an elongate body 26 which is oriented substantially vertically in use.

Each of the upper arm connector/mount 24 and the lower arm connector/mount 25 shown is generally cylindrical. Each arm rod 18, 19 is elongate and substantially circular in cross-section with an end portion which is hollow and tubular in order to be received over the generally cylindrical upper arm connector/mount 24 and lower arm connector/mount 25 respectively.

Each of the upper arm connector/mount 24 and lower arm connector/mount 25 has a stiffening or bracing web 27 provided between the connector/mount and the elongate body 26 in order to maintain the connector/mount 24, 25 in orientation relative to the elongate body 26. Typically, each of the connector/mounts 24, 25 is substantially perpendicular to the elongate body 26 and each mounts an arm rod 18, 19.

The body 26 of the pivot knuckle 20 has a pair of mounting grooves 28 provided on a rear side defined between a pair of blocks 29. An opening 30 is provided through each of the blocks 29 transversely to the mounting grooves 28 in order to receive a pivot pin. The grooves 28 in the preferred embodiment are substantially perpendicular to the pivot pin. Insertion of the pivot pin through the openings 30 in the respective blocks 29 can then be used to attach an adjacent pivot knuckle 20 relative to a first pivot knuckle 20, by location of a tongue 31 having a mounting opening 32 (explained further below) on the adjacent pivot knuckle 20 in the respective grooves 28 and then inserting the pivot pin through the aligned openings.

A countersunk surround 33 is provided about an upper opening in an upper block and a lower opening in a lower block in order to seat the head of the pivot pin to be substantially coplanar with the surface of the upper and lower block respectively.

Each of the blocks 29 will typically have an arcuate rear corner 34 between the substantially planar rear wall 35 and a substantially perpendicular and planar sidewall 36. The rear wall 34 and/or sidewall 36 will typically function to limit rotation of the pivot knuckle 20 and/or an adjacent pivot knuckle 20.

A rotation stop face 37 is preferably provided to prevent over rotation of one pivot knuckle relative to another pivot knuckle. The rotation stop face 37 is angled so as to limit rotation of a pivot knuckle 20 relative to another pivot knuckle 20 to approximately 60° although this will depend upon the configuration and number of arms provided.

The body 26 of the pivot knuckle 20 also has a pair of tongues 31 provided on an opposite side of the body 26 to the blocks 29 defining the grooves 28. In use, each of the tongues 31 of one pivot knuckle 20 are received within a respective groove 28 in an adjacent pivot knuckle 20 in order to attach the pivot knuckles 20 together but still allow rotation of the pivot knuckles 20 relative to one another. As mentioned above, there is a mounting opening 32 provided in each tongue 31 transversely through each tongue 31 and this will align with the mounting opening 30 provided in each of the blocks 29.

The tongue 31 is preferably arcuate. The shaped groove 28 and tongue 31 will also preferably have shaped abutment surfaces which, when they abut, limit rotation of a pivot knuckle relative 20 to a second pivot knuckle 20.

A pair of spaced apart elongate arm rods 18, 19 are mounted to each pivot knuckle 20. Each of the arm rods 18, 19 is typically circular in cross-section. Whilst any material of construction can be used, a light weight but strong material such as carbon fibre or fibreglass or similar is preferred. Typically, an arm rod 18, 19 is provided for each connector/mount 24, 25. Once attached, the arm rods 18, 19 are spaced apart and a spreader component 38 is preferably provided between the arm rods 18, 19 of an arm 17 in order to maintain the arm rods 18, 19 separately to one another. The spreader component 38 will typically be offset in position on adjacent arms as shown in FIGS. 6 and 33 to allow stacking of the arms 17 in the stowed condition.

As illustrated in FIGS. 30 to 36, a toe connector 39 is provided at an outermost end of each arm 17 in order to connect the outer ends of the respective arm rods 18, 19 of an arm 17 relative to one another.

Normally, an opening is provided in the toe connector in order to insert an outer end of each of the respective arm members. One upper opening is provided and one lower opening is provided in the preferred form.

An opening 40 is preferably provided on the toe connector in order to allow for attachment of a support leg (not shown) if provided. One or more openings 41 may be provided to attach ropes or similar cables to the toe connector 39 in order to tie down or fix the awning in position when deployed.

A pair of hook slots 42 are provided adjacent to an arcuate outer end 43 of the toe connector 39 in order to receive and retain an edge of an awning sheet relative thereto.

The toe connector will normally be manufactured from a moulded plastic or similar and the shape and configuration of the toe connector 39 will typically mean that an awning sheet can be provided over the top of the upper arm rod 18 in an arm 17 and about a smooth arcuate outer end 43 of the toe connector 39 before an edge of the awning sheet is seated in the hook slot 42 to retain the awning sheet in position. This will generally minimise any chance of tearing of the awning sheet during assembly.

The configuration explained above will preferably form an elongate substantially triangular shaped arm formed from a pivot knuckle, a pair of arm members, a preferred spreader and a toe connector.

The housing 12 may be provided with one or more lights and in a preferred embodiment, a light strip provided on an interface of the rear wall. In a preferred configuration, the light strip 44 will typically clip to an inner side the rear wall 13 and will function to provide light when the awning is deployed.

The awning includes at least one awning sheet provided extending between the arms of the at least one deployable arm assembly. One or awning sheet may be provided. Preferably the awning sheet is mounted relative to the arms and may or may not be mounted relative to the housing itself. The awning sheet may be mounted relative to the arm is releasably in order to allow easy removal of the awning sheet from the arms before storage. However, it is preferred that the awning sheet be mounted relative to the arms during assembly and remain mounted relative to the arms during any subsequent deployment or storage.

Typically, the awning sheet is attached over the upper arm member of each arm and attached to the toe connector via the engagement of an edge of the awning sheet with the hook slot provided in the preferred toe connector. A spline member may be provided at an outer edge of the awning sheet in order to assist with the attachment to the toe connector.

The awning of the preferred embodiment can therefore be moved between a stored condition and a deployed condition to provide shelter as required and to the degree required by the user. The awning of the preferred embodiment will preferably have a batwing configuration and allow deployment in various configurations as desired by a user.

The awning of the preferred embodiment can also include an arm knuckle comprising a primary pivot, and a secondary pivot that subsequent arm knuckles dependently pivot from.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A multiconfiguration, deployable awning assembly to be mounted to a vehicle, the awning assembly including:
   a) a housing having at least a rear wall portion to mount relative to the vehicle, a top wall portion, and a spaced apart bottom wall portion;
   b) at least one deployable arm assembly including:
      i. a primary pivot mounted between the top wall portion and the bottom wall portion of the housing;
      ii. at least two arms, each arm including a pair of spaced apart elongate members comprising one upper arm member and one lower arm member, both arm members mounted relative to a pivot, a first arm of the at least two arms mounted relative to the primary pivot and a second arm of the at least two arms mounted relative to a second pivot; and
   c) an awning comprising at least one flexible awning sheet mounted relative to the arms, wherein the awning is movable between a stored configuration and a deployed configuration by rotation of the arms about the primary pivot,
   wherein the primary pivot is directly connected to the second pivot such that the second pivot is rotatably mounted to the primary pivot; and
   wherein the second pivot is indirectly mounted to the housing via the primary pivot.

2. An awning assembly as claimed in claim 1, wherein the housing is mounted relative to the vehicle such that the awning can be deployed from the housing using the vehicle as a fixture point.

3. An awning assembly as claimed in claim 1, wherein the housing further includes a cover being mounted or mountable relative to the top wall portion and/or bottom wall portion in order to close the housing.

4. An awning assembly as claimed in claim 3, wherein the cover is moved out of position in order to allow the at least one deployable arm assembly to be deployed, the cover being pivotally mounted to the housing such that it can be rotated out of the way prior to deployment of the at least one deployable arm assembly.

5. An awning assembly as claimed in claim 1, wherein a pair of deployable arm assemblies is provided, each arm assembly of the pair of deployable arm assemblies being mounted relative to opposite ends of the housing.

6. An awning assembly as claimed in claim 5, wherein a first deployable arm assembly of the pair of deployable arm assemblies is mounted about the primary pivot which is mounted relative to the top and bottom wall portions of the housing immediately adjacent to the rear wall portion of the housing at one end of the housing, and a second deployable arm assembly of the pair of deployable arm assemblies is mounted about another primary pivot which is mounted relative to the top and bottom wall portions of the housing in front of the first deployable arm assembly such that the second deployable arm assembly is relatively closer to free ends of the top and bottom wall portions of the housing and further away from the rear wall portion of the housing.

7. An awning assembly as claimed in claim 5, wherein each arm assembly of the pair of deployable arm assemblies is configured to pivot or rotate into the deployed configuration in opposite directions to one another.

8. An awning assembly as claimed in claim 1, wherein the primary pivot of the at least one deployable arm assembly mounts the first arm of the at least two arms relative to the housing, and other arms of the at least two arms are mounted relative to the primary pivot, with each arm in the at least one deployable arm assembly mounted relative to each adjacent arm.

9. An awning assembly as claimed in claim 8, wherein the primary pivot is a first pivot knuckle comprising a pivot pin.

10. An awning assembly as claimed in claim 9, wherein a second pivot knuckle is mounted to the first pivot knuckle, wherein a third pivot knuckle is mounted to the second pivot knuckle, and wherein a fourth pivot knuckle is mounted to the third pivot knuckle.

11. An awning assembly as claimed in claim 10, wherein the pivot knuckles are configured to nest when in the stored configuration and are configured to be offset longitudinally from one another when mounted relative to the housing in the deployed configuration.

12. An awning assembly as claimed in claim 10, wherein each pivot knuckle has an arm of the at least two arms associated therewith, the arm including the pair of spaced apart elongate arm members which are mounted on, or relative to, or extend from the pivot knuckle, and wherein each pivot knuckle rotatably connects adjacent arms of the at least two arms to one another.

13. An awning assembly as claimed in claim 10, wherein a rotation stop face is provided to prevent over rotation of one pivot knuckle relative to another pivot knuckle, the rotation stop face being angled so as to limit rotation of a pivot knuckle relative to another pivot knuckle to approximately 60°.

14. An awning assembly as claimed in claim 10, wherein tongues of one pivot knuckle are configured to be received within respective grooves of an adjacent pivot knuckle in order to attach the pivot knuckles together but still allow rotation of the pivot knuckles relative to one another.

15. An awning assembly as claimed in claim 10, wherein a pair of spaced apart elongate arm members of an arm are mounted to and attached directly to each pivot knuckle, and a spreader component is provided between the arm members in order to maintain the arm members separately to one another, and wherein the spreader component is offset relative to a spreader component provided on an adjacent arm to allow stacking of the arms.

16. An awning assembly as claimed in claim 1, wherein a toe connector is provided at an outermost end of each arm in order to connect the outer ends of respective arm members of an arm relative to one another.

17. An awning assembly as claimed in claim 1, wherein:
the housing is provided with one or more lights; and/or
the at least one flexible awning sheet is mounted relative to the arms and can be moved between the stored configuration and the deployed configuration to provide shelter as required and to the degree required by the user.

18. An awning assembly as claimed in claim 1, wherein the primary pivot is a first pivot knuckle comprising a first pivot pin, and the second pivot is a second pivot knuckle comprising a second pivot pin, and wherein the second pivot pin is at least partially received within the first pivot knuckle.

19. An awning assembly as claimed in claim 18, wherein the second pivot knuckle is configured to nest within the first pivot knuckle when in the stored configuration.

20. An awning assembly as claimed in claim 1, wherein the primary pivot is a first pivot knuckle comprising a first pivot pin, and the second pivot is a second pivot knuckle comprising a second pivot pin, and wherein the second pivot knuckle is rotatably mounted relative to the first pivot knuckle via the second pivot pin.

\* \* \* \* \*